United States Patent [19]

Hamada et al.

[11] Patent Number: 5,206,910
[45] Date of Patent: Apr. 27, 1993

[54] STEREO MICROPHONE UNIT

[75] Inventors: Ichiro Hamada, Tokyo; Kiyoshi Ohta, Kanagawa; Yoshihiro Ono, Saitama, all of Japan

[73] Assignee: Sony Corporation, Tokyo, Japan

[21] Appl. No.: 703,756

[22] Filed: May 21, 1991

[30] Foreign Application Priority Data

May 22, 1990 [JP] Japan .................. 2-132051

[51] Int. Cl.⁵ .................................. H04R 5/027
[52] U.S. Cl. .................................. 381/26; 381/92
[58] Field of Search .................................. 381/92, 26

[56] References Cited

FOREIGN PATENT DOCUMENTS

| 0131799 | 1/1985 | European Pat. Off. . |
| 0160431 | 11/1985 | European Pat. Off. . |
| 0033396 | 2/1983 | Japan .................. 381/92 |
| 0064994 | 4/1984 | Japan .................. 381/92 |
| 2220818A | 1/1990 | United Kingdom . |

Primary Examiner—Forester W. Isen
Attorney, Agent, or Firm—Lewis H. Eslinger; Jay H. Maioli

[57] ABSTRACT

A stereo microphone unit adapted to be installed in a video camera or the like, includes a cabinet, two nondirectional microphones disposed with a predetermined distance therebetween on respective walls of the cabinet for collecting an outside sound signal, delay circuits for delaying each output of the microphones by a time period corresponding to the predetermined distance, and signal subtractors for subtracting the output of the delay circuit relative to one microphone from the output of the other microphone. A stereo audio signal is provided only with regard to the output sound signal of any frequency lower than a predetermined frequency of 6 kHz or so.

5 Claims, 6 Drawing Sheets

STEREO MICROPHONE UNIT

BACKGROUND OF THE INVENTION

1. Field of the Invention

The present invention relates to a built-in type stereo microphone unit adapted to be installed in a video camera or the like where sound is recordable in a stereophonic mode.

2. Description of the Prior Art

Figure 6:
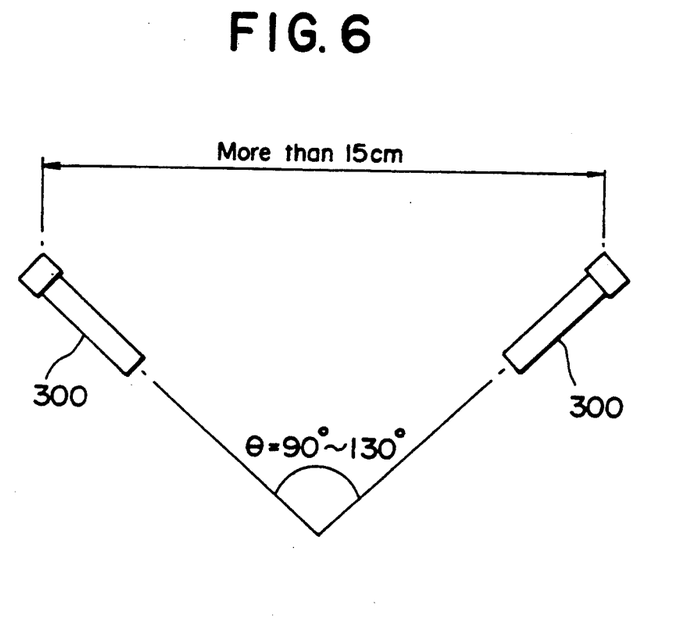
FIG. 6 illustrates a fundamental constitution in stereophonic recording.

For processing input sound in a stereophonic mode, it is customary to prepare two unidirectional microphones 300 as illustrated in FIG. 6. Such two microphones 300 are so disposed that the sound receiving directions thereof form an angle $\theta$ (ranging from 90° to 130°) and also that the sound receiving positions thereof are spaced apart from each other by a distance greater than 15 cm.

Figure 7:
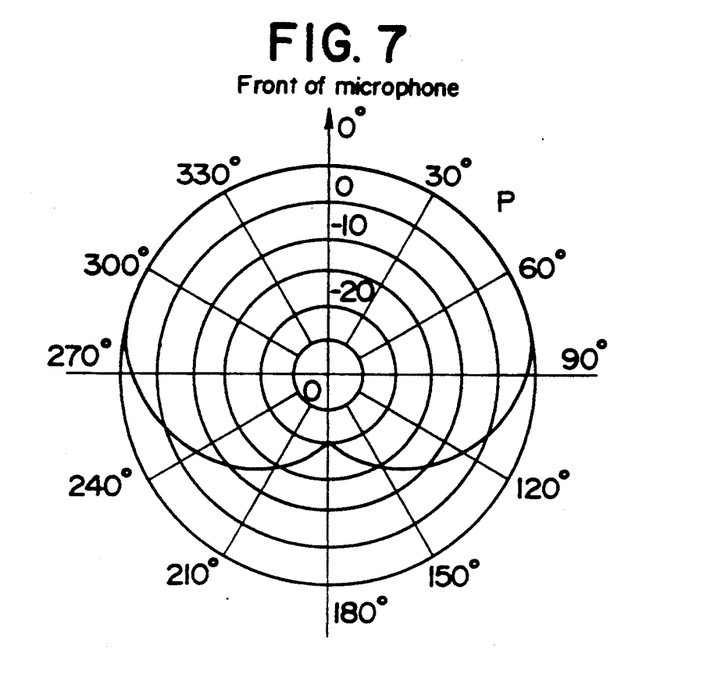
FIG. 7 shows the directivity characteristics of a unidirectional microphone.

The unidirectional microphone 300 generally has such directivity characteristic as represented by a plot P in FIG. 7, and the plot P is obtained when the microphone 300 is disposed at a center O.

Figure 8:
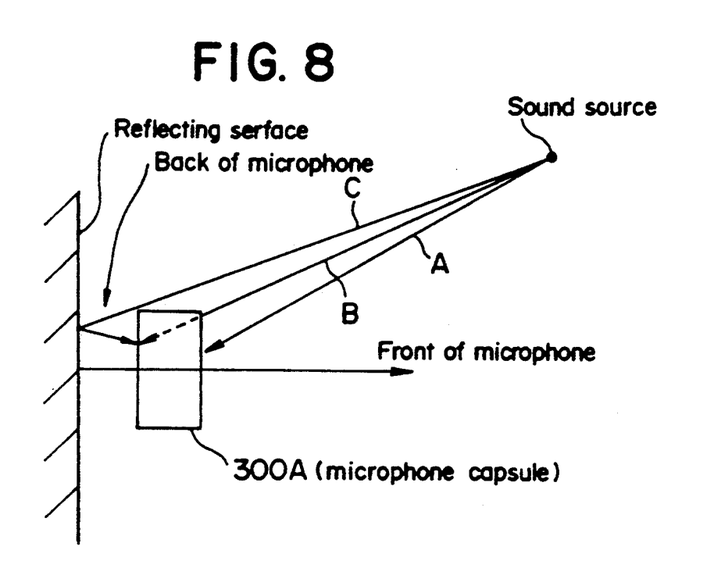
FIG. 8 illustrates an exemplary state where a unidirectional microphone is used.

As will be understood from FIG. 8 also, if each microphone 300 is used incorporated in a microphone capsule 300A, the characteristic shown in FIG. 7 is achieved upon mutual combination of sound waves A and B emitted from a sound source and received at the front and the back of the microphone capsule 300A.

It is therefore necessary to ensure, behind the microphone capsule 300A, a sufficient space without any impediment or reflective surface so as to avert a phenomenon that the sound waves from the sound source are reflected as denoted by C and then are received by the microphone 300.

Figure 9:
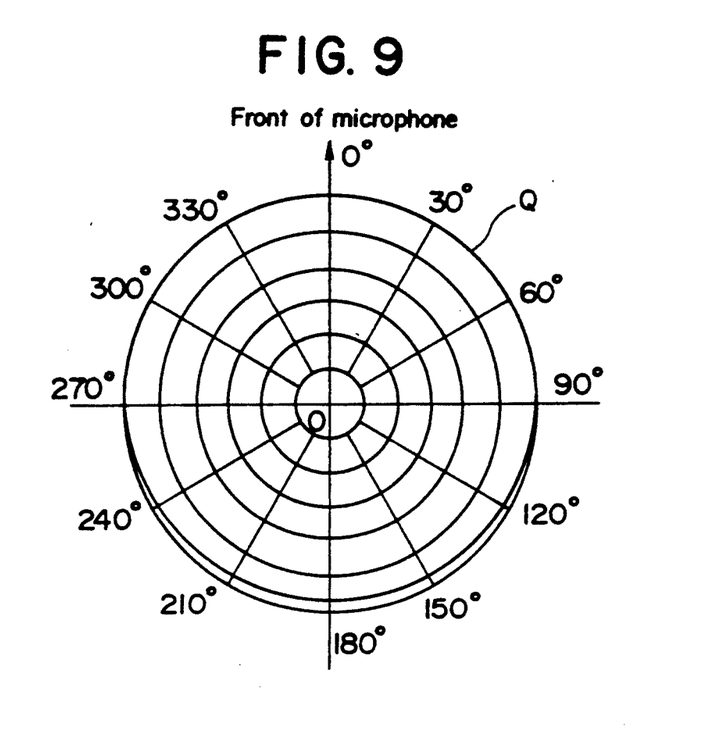
FIG. 9 shows the directivity characteristics of a nondirectional microphone.

There may be contrived a technique of performing a stereophonic recording operation by the use of two nondirectional microphones each having such directivity characteristic as represented by a plot Q in FIG. 9, but such technique is not employed in general.

However, if unidirectional microphones 300 are installed in a casing of a small-sized video camera for example, a sufficient space is not existent around microphone capsules 300A to permit execution of a stereophonic recording operation. Therefore it is customary that one-point stereo microphones are provided in a posture projecting outward from the casing.

Since restriction is unavoidable with respect to dimensional reduction of a video camera and the degree of freedom in design and so forth, it has been urgent heretofore to realize development of superior microphones which are adapted to be installed in a casing and are still capable of performing a stereophonic sound processing operation.

OBJECT AND SUMMARY OF THE INVENTION

It is an object of the present invention to provide an improved built-in type stereo microphone unit which executes a stereophonic sound processing mode in a state installed in a casing of a video camera or the like.

For the purpose of achieving the object mentioned, the stereo microphone unit of the present invention comprises a cabinet, two nondirectional microphones disposed with a predetermined distance therebetween on the wall of the cabinet for collecting outside sound signal, delay means for delaying each output of the microphones by a time period corresponding to the predetermined distance, and subtracter means for subtracting the output of the delay means relative to one microphone from the output of the other microphone.

In such stereo microphone unit, a stereophonic effect is attained with regard to relatively higher-pitched sound by the distance existing between the two microphones and, with regard to relatively lower-pitched sound, by electrically processing the audio signals input to and output from the two microphones, thereby enabling a stereophonic operation with the microphones installed in a casing of a video camera or the like.

The above and other features and advantages of the present invention will become apparent from the following description which will be given with reference to the illustrative accompanying drawings.

BRIEF DESCRIPTION OF THE DRAWINGS

FIGS. 2 and 3 illustrate the structure of a cabinet, in which FIG. 3 is a sectional view taken along the line III—III in FIG. 2;

DESCRIPTION OF THE PREFERRED EMBODIMENT

Hereinafter a preferred embodiment of the built-in type stereo microphone unit of the present invention will be described in detail with reference to the accompanying drawings.

Figure 1:
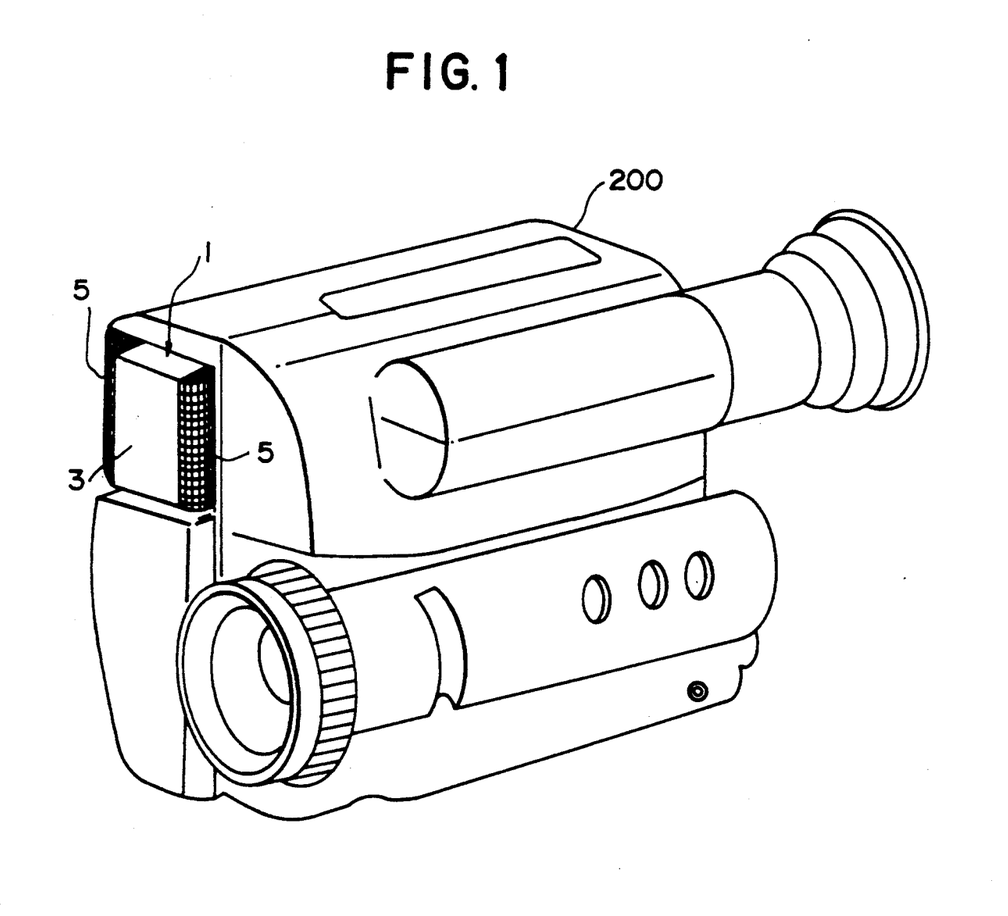
FIG. 1 is a perspective view of a preferred embodiment of the built-in type stereo microphone unit according to the present invention.

In FIG. 1, a stereo microphone unit 1 according to the present invention is installed integrally with a front portion of a casing of a video camera 200, for example.

Figure 2:
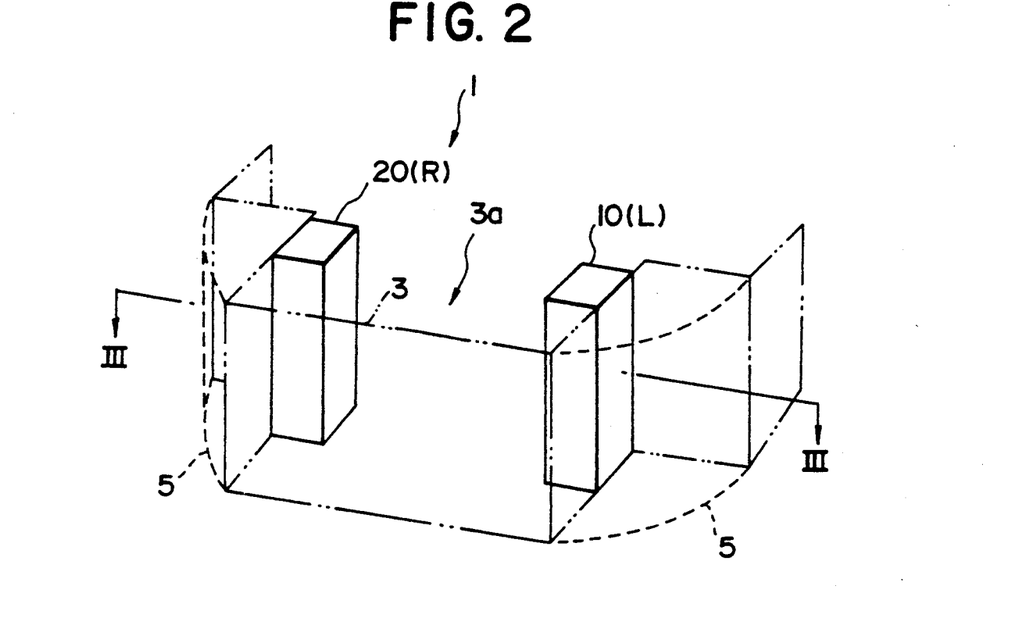
Figure 3:
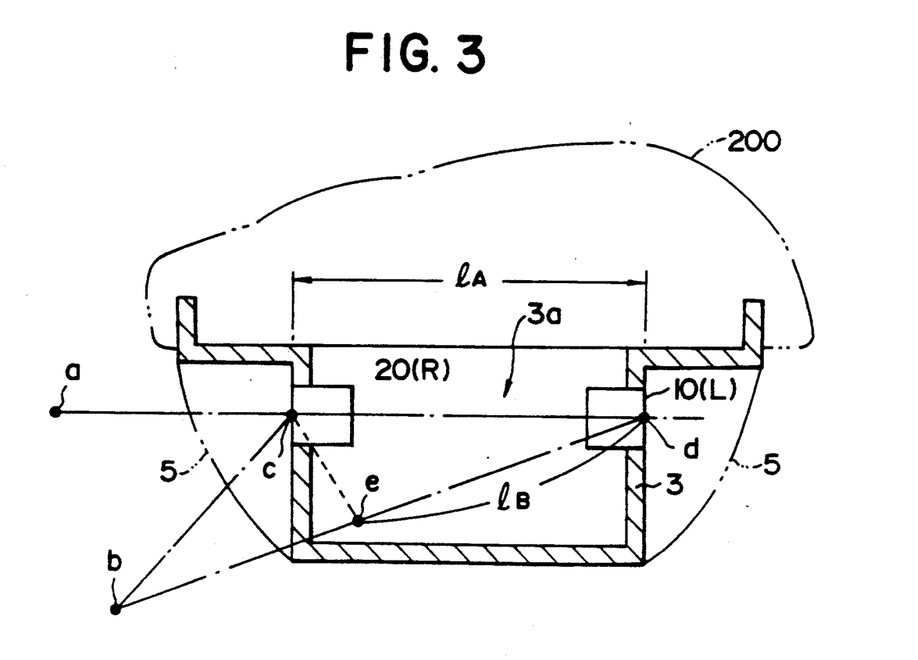

As will be understood from FIGS. 2 and 3 also, the stereo microphone unit 1 comprises a substantially ⌐-shaped cabinet 3 in cross section and two microphones 10, 20 housed in the cabinet 3 for left (L) and right (R) channels, respectively.

In the cabinet 3, there is formed a space 3a where sound receiving surfaces c, d of the two microphones 10, 20 are positioned apart from each other by a distance 1A of, e.g., 30 mm.

The two microphones 10, 20 are nondirectional with the directivity characteristic represented by a curve Q in FIG. 9 and are disposed in such postures that the sound receiving surfaces c, d thereof are directed toward the outside of the cabinet 3. And protective net members 5, 5 are attached to the cabinet 3 at the fronts of the sound receiving surfaces c, d.

Figure 4:
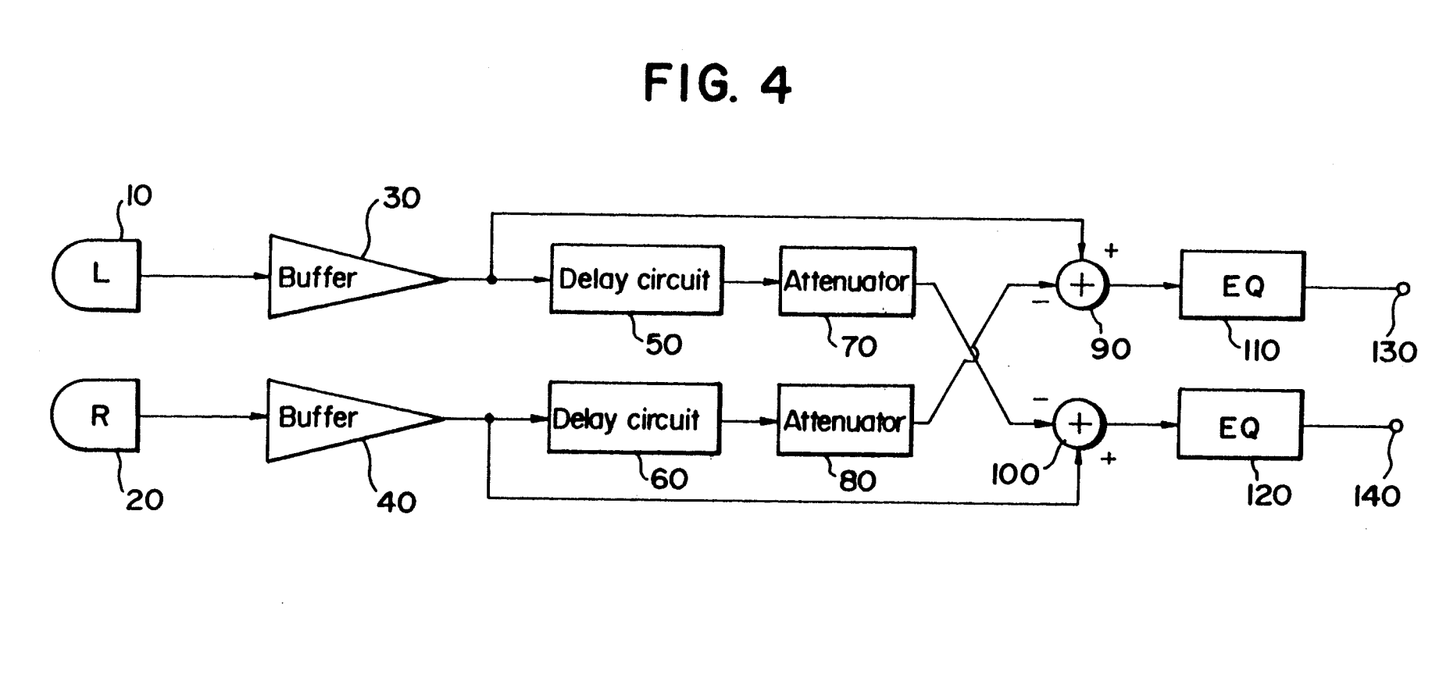
FIG. 4 is a block diagram of an electric constitution of the embodiment.

As will be understood from FIG. 4, sound waves received by the microphones 10, 20 are converted into audio signals, which are then supplied to delay circuits 50, 60 respectively via buffer amplifiers 30, 40 and are further supplied to adders 100, 90 respectively via attenuators 70, 80.

In this case the output signals of the attenuators 70, 80 are polarity-inverted, and the output signals of the buffer amplifiers 40, 30 are supplied also to the adders 100, 90.

The output signals of the adders 90, 100 are supplied, as L-channel and R-channel audio signals respectively, to output terminals 130, 140 via equalizers (EQ) 110, 120 respectively.

Each of the delay circuits 50, 60 may be composed of a general low-pass filter which principally comprises a resistor and a capacitor.

Figure 5:
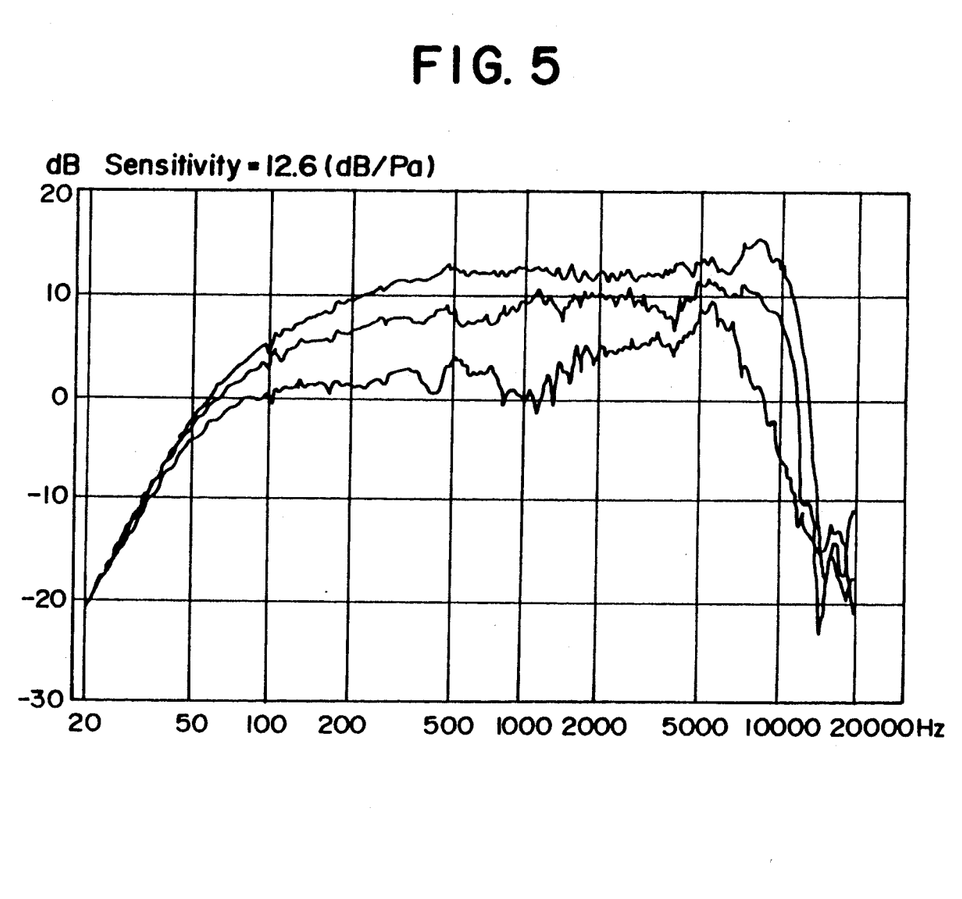
FIG. 5 graphically shows the frequency characteristics of microphones.

In the stereo microphone unit 1 of the constitution described above, sound waves of any wavelengths smaller than the distance 1A (in this embodiment, frequencies higher than 6 kHz; are so processed that, as will be understood from FIG. 5, level differences occur correspondingly to the distance 1A among audio signals α, β, γ received and output from the front, back and face of the microphone 10 (or 20), so that a stereophonic effect can be achieved by such frequency characteristics.

More specifically, with regard to any sound waves of frequencies higher than 6 kHz, a stereophonic sound processing operation is performed by the structure of the cabinet 3.

This level difference is the cause for what is called an acoustic shadow. That is, in FIG. 3, sound from the left side of the figure, sound source a, reaches directly to the microphone 20(R). But only sound reflected from surrounding surface of the cabinets reaches to the microphone 10(L). Since the reflected sound travels a long way in the reflected path and loses energy at each reflection, the intensity of sound picked up by the microphone 10(L) is reduced.

This acoustic shadow appears only for high frequency sound, more than 6 kHz, in this model. If the wave length of a sound is much longer than the distance between microphone 20(R) and 10(L), 1A, in FIG. 3, acoustic shadow does not appear. But if the wave length of a sound is shorter than or as the same as the distance between two microphones, acoustic shadow appear.

Meanwhile with regard to any sound waves of frequencies lower than 6 kHz, a stereophonic effect can be realized by the circuit constitution shown in FIG. 4.

When the R-channel microphone 20 is positioned closer to sound sources a, b as shown in FIG. 3, the time required for sound waves to reach the L-channel microphone 10 is delayed, as compared with the arrival at the other microphone 20, for a time period corresponding to the travel of the sound waves through a distance 1A ($\overline{ad} - \overline{ac}$) relative to the sound source a or through a distance 1B ($\overline{bd} - \overline{bc} = \overline{bd} - \overline{be}$) relative to the sound source b.

Therefore the output signal of the buffer amplifier 40 is delayed by the delay circuit 60 for such time period, and then the delayed signal is subtracted from the output signal of the buffer amplifier 30, whereby the output of the adder 90 is substantially canceled to consequently attain a stereophonic effect.

In case the sound sources are more proximate to the microphone 10, the R-channel output is canceled just as in the above.

Now the principle of the above operation will be described in further detail. As given below, Eq. (1) is obtained in relation to sound waves sin ωt arriving at the microphone 20 (where ω is angular velocity, and t is time); sound waves L (ω) received by the microphone 10; delayed phase angle φ (function of 1A and ω) at the microphone 10; variation a (23 1) in the attenuator 80; and phase angle ψ corresponding to the delay caused by the delay circuit.

$$L(\omega) = \sin(\omega t - \phi) - a\sin(\omega t - \psi) \quad (1)$$

$$= \sin\omega t \cos\phi - \cos\omega t \sin\phi - a(\sin\omega t \cos\psi - \cos\omega t \sin\psi)$$

$$= \sin\omega t \cos\phi - a\sin\omega t \cos\psi - \cos\omega t \sin\phi + a\cos\omega t \sin\psi$$

$$= \sin\omega t(\cos\phi - \cos\psi) - \cos\omega t(\sin\phi - \sin\psi) +$$

$$(1-a)(\sin\omega t \cos\psi - \cos\omega t \sin\psi)$$

$$= \sin\omega t \left( 2\sin\frac{\phi+\psi}{2} \sin\frac{\phi-\psi}{2} \right) -$$

$$\cos\omega t \left( 2\cos\frac{\phi+\psi}{2} \sin\frac{\phi-\psi}{2} \right) + (1-a)\sin(\omega t - \psi)$$

$$= 2\sin\frac{\phi-\psi}{2} \left( \sin\omega t \sin\frac{\phi+\psi}{2} - \cos\omega t \cos\frac{\phi+\psi}{2} \right) +$$

$$(1-a)\sin(\omega t - \psi)$$

$$= -2\sin\frac{\phi-\psi}{2} \cos\left( \omega t + \frac{\phi+\psi}{2} \right) +$$

$$(1-a)\sin(\omega t - \psi)$$

If the delay is set to be equal tot he delayed phase angle (i.e., $\phi = \psi$), the following is obtained from Eq. (1).

$$L(\omega) = (1-a)\sin(\omega t - \psi)$$

Setting the condition as a = 1, the above equation is $$L(\omega) = 0$$

In this case the sound wave R (ω) received by the microphone 20 is expressed as $$R(\omega) = \sin\omega t - a\sin(\omega t - \phi - \psi) \quad (2)$$

Therefore, the above Eq. (2) may be rewritten as $$R(\omega) = \sin\omega t \{1 - \cos(\phi + \psi)\} + \cos\omega t$$

$$\sin(\phi + \psi) + (1-a)\sin(\omega t - \phi - \psi) \quad (3)$$

Accordingly, when $\phi = \psi$, $$R(\omega) = 2\sin\phi\cos(\omega t - \phi) + 1 - a)\sin(\omega t - 2\phi)$$

If a = 1, the above becomes $$R(\omega) = 2\cos(\omega t - \phi)\sin\phi$$

From Eqs. (1) and (3), the following can be defined. i) When the sound source is at a position where $\phi = \psi$, $$R(\omega) = 2\sin\phi\cos(\omega t - \phi) + (1-a)\sin(\omega t - 2\phi)$$

$$L(\omega) = (1-a)\sin(\omega t - \psi)$$

(ii) When the sound source is at a position where $\phi = \psi$ and a = 1, $$R(\omega) = 2\sin\phi\cos(\omega t - \phi)$$

$L(\omega) = 0$ (iii) When the sound source is at a position where $\phi \neq \omega$ and $a = 1$, $$R(\omega) = \sin\omega t\{1 - \cos(\phi + \psi)\} + \cos\omega t \sin(\phi + \psi)$$

$$L(\omega) = 2\sin\frac{\phi - \psi}{2}\cos\left(\omega t + \frac{\phi + \psi}{2}\right)$$

In each of the above three cases, a stereophonic effect (difference between left and right levels) is attainable as will be understood from the frequency characteristics shown in FIG. 5.

Thus, according to the present invention, a stereophonic effect regarding sound waves of frequencies higher than 6 kHz can be achieved by the structure of the cabinet 3, and a stereophonic effect regarding sound waves of frequencies lower than 6 kHz can be achieved by the electric processing.

Since the cabinet 3 is installed integrally with the casing of the video camera 200, a stereophonic sound receiving and recording operation can be performed in a state where the stereo microphone unit 1 is built in the casing of the video camera 200.

Consequently it becomes possible to attain a dimensional reduction with incorporation of the stereo microphone unit 1, hence forming the video camera 200 into a further compact structure while enhancing the degree of freedom in overall design and so forth.

As described hereinabove, according to the built-in type stereo microphone unit of the present invention, a stereophonic effect with regard to relatively higher-pitched sound is attained by the structure of the cabinet, and a stereophonic effect with regard to relatively lower-pitched sound is attained by the electric constitution inclusive principally of delay circuits and adders.

Therefore, sound waves can be received and processed in a stereophonic mode even in a state where the cabinet is installed integrally with the casing of a video camera for example, i.e., the microphone unit is built in the casing.

Consequently it becomes possible to realize a dimensional reduction of the microphone unit while enhancing the degree of freedom in design of the video camera or the like, hence further diminishing the entire dimensions thereof.

What is claimed is:

1. A stereo microphone unit for providing left and right stereo audio signals, comprising:
   a cabinet having two oppositely facing walls spaced apart by a distance determined by a wavelength of an audio signal at a predetermined crossover frequency;
   two nondirectional microphones mounted on respective walls of said cabinet so as to have said distance therebetween for detecting an outside sound signal and producing respective output signals;
   two delay circuits for respectively delaying the output signal of said microphones and forming low-pass filters having an upper cut-off frequency at said predetermined crossover frequency and producing respective outputs; and
   subtracter means for subtracting the output of each delay circuit corresponding to one microphone from the output of the other microphone, whereby left and right stereo audio signals are produced.

2. A stereo microphone unit according to claim 1, wherein sound receiving surfaces of said two microphones are directed outwardly relative to an interior of said cabinet, with the facing directions of said two microphones being opposite each other, and said two microphones being installed in respective apertures formed in said walls so that said sound receiving surfaces of said two microphones are substantially flush with said walls.

3. A stereo microphone unit according to claim 2, wherein said distance between said two oppositely facing walls is approximately 30 mm, and said predetermined crossover frequency is approximately 6 kHz.

4. A stereo microphone unit according to claim 1, further comprising: attenuator means for controlling the output level of said delay circuits and equalizer means for compensating the frequency characteristic of the output of said subtractor means.

5. A portable television camera apparatus comprising:
   a housing;
   a television camera supported in said housing and having an input for receiving the light derived from image fields being scanned by said camera;
   microphone means for collecting a sound signal and providing stereophonic audio signals, said microphone means comprising a cabinet having two oppositely facing walls spaced apart by a distance determined by a wavelength of an audio signal at a predetermined low-pass frequency, two nondirectional microphones disposed with said distance therebetween on respective walls of said cabinet for detecting an outside sound signal, delay means for delaying an output of each of said microphones and forming low-pass filters having a cut-off frequency substantially equal to said low-pass frequency, and subtracter means for subtracting the output of each delay means corresponding to one microphone from the output of the other microphone; and
   recorder means for recording the outputs of said television camera and said microphone means.

* * * * *

UNITED STATES PATENT AND TRADEMARK OFFICE
CERTIFICATE OF CORRECTION

PATENT NO. : 5,206,910
DATED      : April 27, 1993
INVENTOR(S): Ichiro Hamada; Kiyoshi Ohta and Yoshihiro Ono It is certified that error appears in the above-indentified patent and that said Letters Patent is hereby corrected as shown below:

```
In the Abstract, line  3, after "like" delete ","
Col. 3, line 13, change ";" to --)--
        line 67, change "(231)" to --(≦ 1)--
Col. 4, line 30, change "tot he" to --to the--
        line 59, delete "i)"
        line 60, before "When" insert --i)--
```

In the Claims:

```
Col. 6, line 29, after "circuits" insert --;--
```

Signed and Sealed this

Sixteenth Day of August, 1994

Attest:

BRUCE LEHMAN

*Attesting Officer*   *Commissioner of Patents and Trademarks*